(12) United States Patent
Kamiyama et al.

(10) Patent No.: US 7,311,122 B2
(45) Date of Patent: Dec. 25, 2007

(54) LINING MATERIAL FOR REHABILITATING AN EXISTING PIPE AND A MANHOLE, AND BARRIER LINER AND METHOD FOR REHABILITATING A PIPE AND A MANHOLE

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/399,251

(22) Filed: Apr. 6, 2006

(65) Prior Publication Data
US 2006/0225802 A1    Oct. 12, 2006

(30) Foreign Application Priority Data
Apr. 11, 2005 (JP) .............................. 2005-112947

(51) Int. Cl.
*F16L 55/16* (2006.01)
(52) U.S. Cl. ...................... 138/98; 138/97; 405/150.1; 405/184.2
(58) Field of Classification Search .................. 138/98, 138/97; 405/150.1, 184.2
See application file for complete search history.

(56) References Cited
U.S. PATENT DOCUMENTS 3,481,369 A * 12/1969 De Ganahl ................. 138/144
4,337,181 A * 6/1982 Otey et al. .................. 523/128
4,600,615 A * 7/1986 Hyodo et al. ............... 138/125
4,778,553 A * 10/1988 Wood .......................... 156/287
5,186,987 A * 2/1993 Imoto et al. ............... 428/34.5
5,334,429 A * 8/1994 Imoto et al. ............... 428/36.2
5,462,983 A * 10/1995 Bloembergen et al. ....... 524/51
5,492,741 A * 2/1996 Akao et al. ................ 428/35.2
5,503,695 A * 4/1996 Imoto et al. .................. 156/71
5,656,117 A * 8/1997 Wood et al. ................. 156/287
6,612,340 B1 * 9/2003 Lause .......................... 138/98
6,710,135 B2 * 3/2004 Tan et al. .................... 525/411
6,932,116 B2 * 8/2005 Smith et al. .................. 138/98

* cited by examiner

*Primary Examiner*—James Hook
(74) *Attorney, Agent, or Firm*—Adams & Wilks (57) ABSTRACT

A pipe lining material for lining the main pipe of a sewer has a soft tubular resin absorption material impregnated with a liquid thermosetting resin, and also has a biodegradable film applied to the external peripheral surface of the pipe lining material. The pipe lining material is everted and inserted in the main pipe, pressed against the internal peripheral surface thereof, and cured to line the main pipe. After the lining is complete, there is no need to peel away and dispose of the biodegradable film because the film that is left behind is naturally decomposed and removed by microorganisms residing within the main pipe. This allows lining work to be simplified and carried out in a shorter period of time, reduces operation costs, and improves the lining finish.

18 Claims, 7 Drawing Sheets

LINING MATERIAL FOR REHABILITATING AN EXISTING PIPE AND A MANHOLE, AND BARRIER LINER AND METHOD FOR REHABILITATING A PIPE AND A MANHOLE

BACKGROUND OF THE INVENTION

1. Field of the Invention

The present invention relates to a lining material adapted for use in lining aging sewage pipes and other existing pipes and manholes, and a barrier liner that covers the external peripheral surface of the lining material, and a method for rehabilitating a pipe and a manhole using these materials.

2. Description of the Prior Art

Known in the art and practice is a lining method for lining existing pipes with a lining material in order to rehabilitate the existing pipes without excavation when sewage pipes and other existing pipes buried underground have aged (refer to Japanese Patent Application Laid-open No. 6-114939, for example). Lining material for rehabilitating an existing pipe (hereinafter also simply referred to as "pipe lining material") is a material in which resin absorption material composed of a soft tubular nonwoven that corresponds to the shape of the existing pipe is impregnated with an uncured liquid curing resin (thermosetting resin, for example). A plastic film composed of a highly airtight polyethylene or the like is applied to cover the external peripheral surface of the resin absorption material. The purpose of the film is to waterproof the pipe lining material and to prevent the liquid curing resin from leaking through. During lining, the pipe lining material is turned inside out, inserted into an existing pipe by using fluid pressure, and pressed against the internal peripheral surface of the existing pipe. In such a state, the pipe is lined by thermosetting or using another method to cure the liquid curing resin impregnated in the pipe lining material. A plastic film on the pipe lining material becomes the internal peripheral surface side by the everted insertion process.

Prior to inserting the pipe lining material into an existing pipe, there are cases in which a soft tubular barrier liner for covering the external peripheral surface of the pipe lining material is inserted into the existing pipe as required in order to stop water from permeating from the periphery, to prevent the pipe lining material from being damaged, and to carry out other measures. The pipe lining material is then inserted inside the barrier liner to line the existing pipe. The barrier liner is composed of highly airtight polyethylene or another plastic film in the same manner as the plastic film of the pipe lining material.

There is also known and practiced a lining method for similarly lining an aging manhole in order to rehabilitate the manhole (refer to Japanese Patent Application Laid-open No. 8-150659, for example). The lining material for rehabilitating a manhole (hereinafter also simply referred to as "manhole lining material") is the same as the pipe lining material, except that the shape corresponds to that of a manhole, and the manhole is lined using the material in the same manner as that used for lining existing pipes. However, the manhole lining material is ordinarily directly inserted without being turned inside out. Also, a plastic film is applied to only the external peripheral surface or to both the external and internal peripheral surfaces of the resin absorption material of the manhole lining material in accordance with differences or other aspects of the heating method for curing the thermosetting resin that is impregnated in the manhole lining material.

In conventional pipe lining and manhole lining materials, the durability (abrasion resistance, acid resistance, and the like) of plastic films such as polyethylene that are applied to the resin absorption material is inferior to that of resin absorption material impregnated with a curing resin (unsaturated polyester, vinyl ester, and the like). For this reason, if the lining work is ended and the existing pipe is again used without removing the plastic film after the lining material has been cured, the plastic film peels away and obstructs the flow of sewage water or the like in the pipeline.

It is for this reason that in a lining operation, work is performed to peel away the plastic film that has been applied to the internal peripheral surface of the resin absorption material of the lining material after the curing resin of the lining material has cured, and there is a drawback in that such work is laborious, project time is extended, and higher costs are incurred. There are also cases in which the entire plastic film cannot be cleanly removed and the internal peripheral surface of the lining material is damaged. In this case, the appearance is worsened, the roughness coefficient of the internal peripheral surface of the lining material is increased, and the flow rate within the existing pipe ends up being reduced. There is a further drawback in that costs are incurred to dispose of the plastic film that has been peeled away.

When a barrier liner composed of conventional polyethylene or another plastic film is used to line an existing pipe, an unneeded barrier liner is semi-permanently left behind after the lining work. For this reason, the barrier liner that has been left behind must eventually be disposed of when the existing pipe is excavated and removed as needed in the future, for example, and costs are thus incurred.

An object of the present invention is to solve the problems described above and to provide a lining material for rehabilitating an existing pipe and a manhole that allows piping and manhole lining work to be simplified and performed in a shorter period of time, and that can reduce operation costs and improve the lining finish, and to provide a barrier liner that can eliminate the need to ultimately dispose of the liner in the future after being used to line an existing pipe.

SUMMARY OF THE INVENTION

A lining material for rehabilitating an existing pipe according to the present invention comprises a tubular resin absorption material impregnated with a liquid curing resin. The pipe lining material further comprises a biodegradable plastic film that is applied to at least one surface selected from the group consisting of the internal peripheral surface and the external peripheral surface of the lining material.

A lining material for rehabilitating a manhole according to the present invention comprises a tubular resin absorption material impregnated with a liquid curing material. The manhole lining material further comprises a biodegradable plastic film that is applied to at least one surface selected from the group consisting of the internal peripheral surface and the external peripheral surface of the manhole lining material.

A barrier liner according to the present invention comprises a tubular resin absorption material impregnated with a liquid curing resin. The barrier liner is comprised of a biodegradable plastic film and used to cover the external peripheral surface of a lining material for rehabilitating an existing pipe.

The present invention also provides a method for rehabilitating an existing pipe and a manhole using these lining materials with the biodegradable plastic films.

In accordance with the present invention, the biodegradable plastic film is applied to the internal peripheral surface or external peripheral surface of the lining material that is used in the work for lining an existing pipe or a manhole. When the lining work for an existing pipe or manhole is completed, the biodegradable plastic film will begin to be naturally decomposed by microorganisms even if left behind after the lining work is completed, and will eventually be removed. Therefore, when the biodegradable plastic film is applied to the internal peripheral surface of the lining material, there is no need to peel away and dispose of the biodegradable film after the lining work is complete, the lining work can be simplified and performed in a shorter period time, and project costs can be reduced. Also, the roughness coefficient of the internal peripheral surface of the lining material can be reduced and the flow rate within the existing pipe and manhole can be increased without damage to the internal peripheral surface of the lining material caused by work to peel away the film. When a biodegradable film is applied to the external peripheral surface of the lining material, there is no need to ultimately dispose of the film in the future and disposal costs are not incurred. Also, excellent effects can be obtained in that the barrier liner is naturally removed in the same manner within the existing pipe after the liner has been used in lining work, so there is no need to ultimately dispose of the film in the future and disposal costs are not incurred.

Further features of the invention, its nature and various advantages will be more apparent from the accompanying drawings and following detailed description of the invention.

DESCRIPTION OF THE PREFERRED EMBODIMENT

The embodiment of the invention will now be described with reference to the accompanying drawings.

Described below is an embodiment of the pipe lining material and barrier liner that are used to line an existing sewage main pipe, and the manhole lining material used to line an existing sewage manhole.

Figure 1:
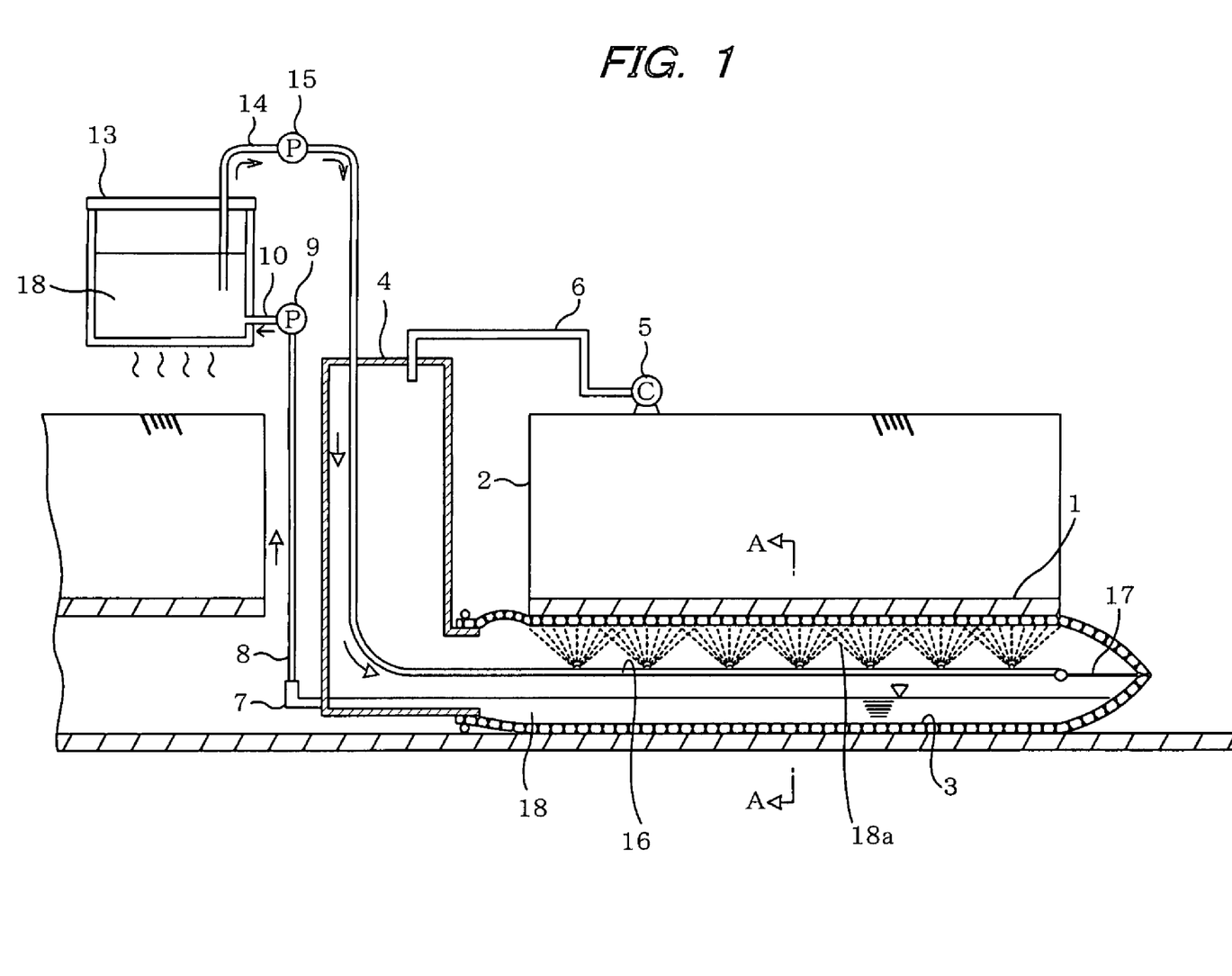
FIG. 1 is a cross-sectional view showing the work of lining a sewer main pipe by using the pipe lining material of the present invention.

FIG. 1 is a cross-sectional view showing the work of lining the main pipe of a sewer. Reference numeral 1 shows an aging sewage main pipe buried in the ground. In an operation in which the pipe is lined for rehabilitation purposes, a soft tubular pipe lining material 3 is inserted in the main pipe 1 from a manhole 2 that leads to the main pipe 1. In this case, the pipe lining material 3 with the inside and outside everted is inserted into the main pipe 1 by applying compressed air or water pressure or another compression medium to the pipe lining material 3 (see FIG. 4b).

Figure 3:
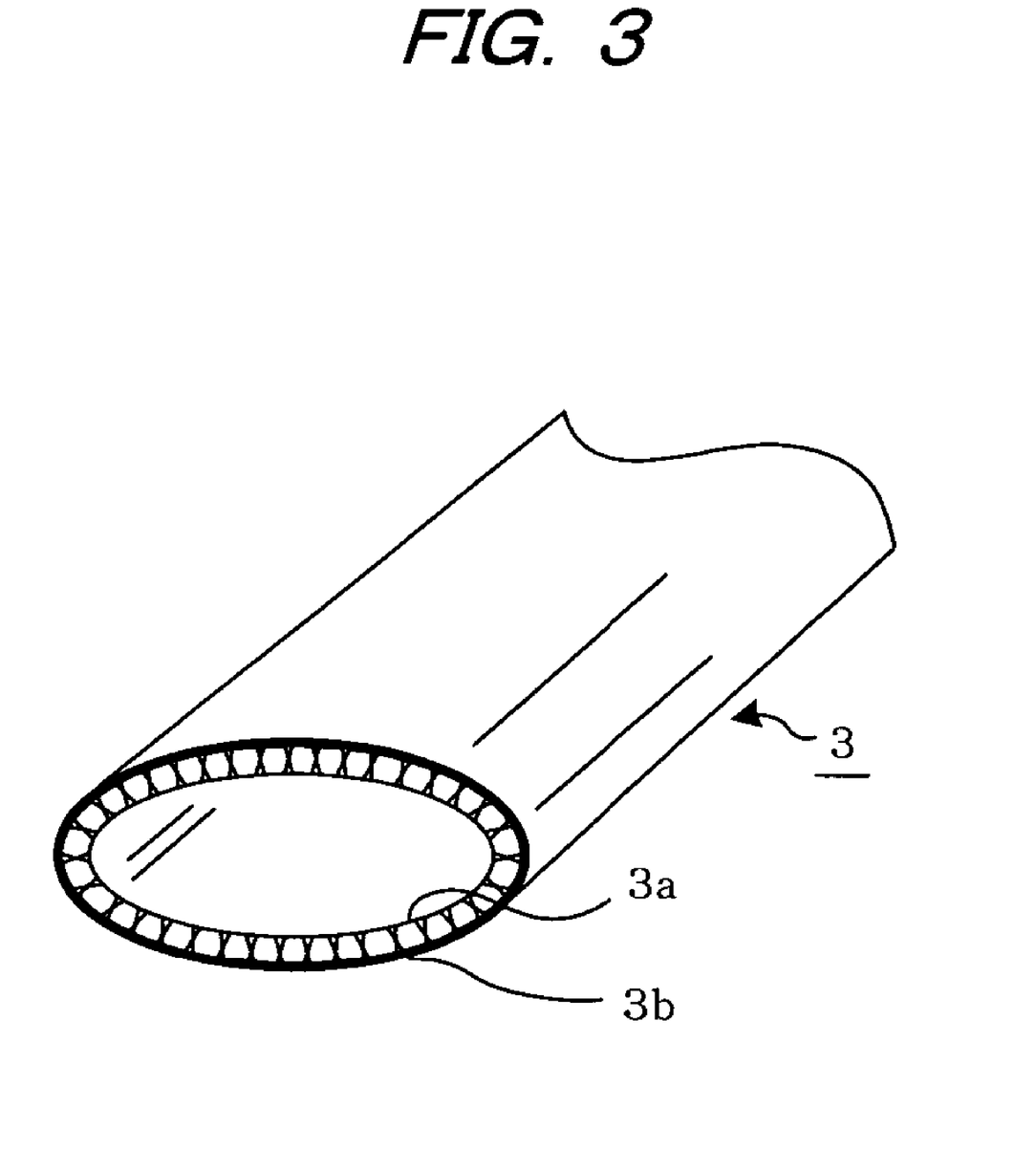
FIG. 3 is a perspective view showing a state prior to using the pipe lining material of the present invention.

The pipe lining material 3 is configured so that a tubular biodegradable plastic film (hereinafter referred to as "biodegradable film") 3b is attached to the external peripheral surface of a soft tubular resin absorption material 3a in order to cover the external peripheral surface thereof, as shown in FIG. 3. Although not depicted, the tubular resin absorption material 3a is impregnated with uncured liquid unsaturated polyester resin, vinyl ester resin, epoxy resin, or another thermosetting resin. The tubular resin absorption material 3a is a nonwoven composed of polyester, vinylon, acrylic, or another fiber that is sewn in the form of a tube, and the outside diameter is formed in tubular shape that corresponds to the inside diameter of the main pipe 1.

The biodegradable film 3b is constituted of a single film layer formed in the shape of a tube whose diameter corresponds to the outside diameter of the tubular resin absorption material 3a. The biodegradable film 3b is composed of PCL (polycaprolactone), PBSA (polybutylene succinate adipate), PLA (polylactic acid), or another biodegradable plastic. A blend of modified starch and the above-described biodegradable plastics may also be used.

The leading end of the pipe lining material 3 is closed and the trailing end is open. The trailing end is joined so as to be airtight with respect to the opening portion formed at the lower end side of a pressure vessel 4 disposed inside the manhole 2, as shown in FIG. 1.

An air compressor 5 is connected to the pressure vessel 4 by way of a pipe 6. A drain pipe 7 is also provided, and a hot water hose 8 connected to a hot water pump 9 disposed aboveground is connected to the drain pipe 7. The hot water pump 9 is connected to the lower portion of a hot water tank 13 by way of a pipe 10, and the pump feeds back wasted hot water for circulation to the hot water tank 13. The hot water tank 13 is heated by a heater (not shown) and the hot water 18 inside the tank is heated to a prescribed temperature or higher. A hot water pump 15 is connected to the upper portion of the hot water tank 13 by way of a pipe 14, and a hot water tube (hot water hose) 16 is connected to the hot water pump 15.

The hot water tube 16 is inserted into the pipe lining material 3 by passing through the pressure vessel 4. The hot water tube 16 is configured so that the leading end is coupled to the leading end of the pipe lining material 3 by way of a rope 17 and is inserted into the main pipe 1 in accompaniment with the insertion of the pipe lining material 3. The airtightness of the insertion portion in the upper end of the pressure vessel 4 into which the hot water tube 16 is inserted is assured by packing or the like (not shown).

The hot water tube 16 is provided with a plurality of sprayers (not shown) disposed at prescribed intervals in the lengthwise direction of the hot water tube 16. Hot water mist 18a is sprayed from the sprayers. As used herein, the term "hot water mist" refers to a large number of very small hot water droplets in the form of a mist.

Figure 2:
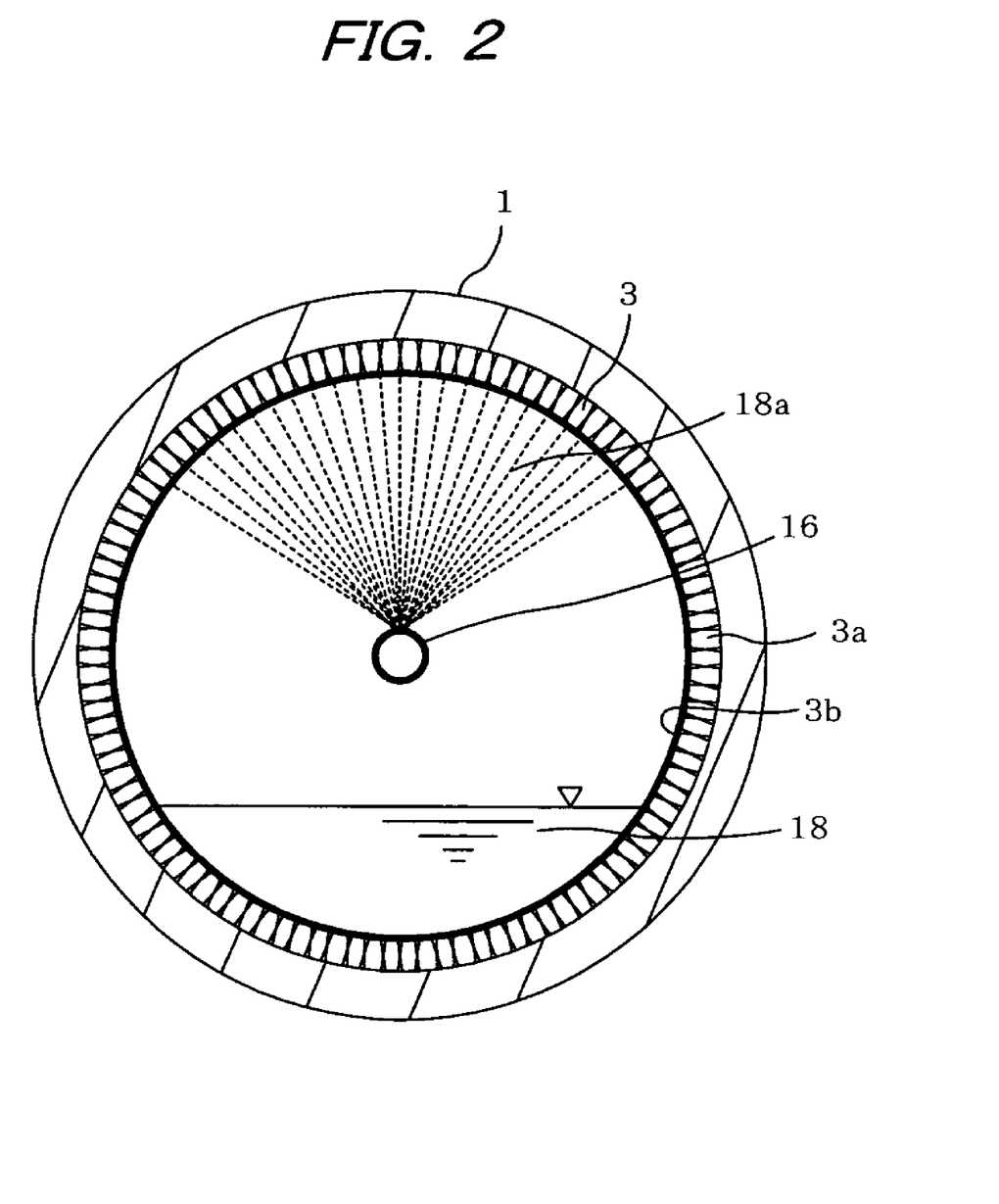
FIG. 2 is a cross-sectional view along the line A-A in FIG. 1.

In lining work, first, the pipe lining material 3 with the inside and outside everted is inserted from the manhole 2 into the main pipe 1 by applying compressed air, pressurized water, or another compression medium to the pipe lining material 3 (see FIG. 4b), as described above. Air pressure is applied to the evertedly inserted pipe lining material 3 by way of the air compressor 5, and the material is expanded and pressed against the internal peripheral surface of the main pipe 1. Since the pipe lining material 3 is turned inside out, that is, the inner and outer circumferences are evertedly inserted, the biodegradable film 3b becomes the internal peripheral surface side of the pipe lining material 3, as shown in FIG. 2, and the exposed external peripheral surface side is pressed against the internal peripheral surface of the main pipe 1.

A heater (not shown) that heats the hot water tank 13 is driven in a state in which the pipe lining material 3 is pressed in this manner, the hot water 18 inside the hot water tank 13 is heated to a prescribed temperature or higher that is required to cure the thermosetting resin of the pipe lining material 3, the hot water pump 15 is driven, and the hot water 18 is pressurized and fed to the hot water tube 16. The hot water mist 18a is dispersed and sprayed from the sprayers of the hot water tube 16, as shown in FIGS. 1 and 2, and blown onto the internal peripheral surface of the pipe lining material 3, thus heating the pipe lining material 3. The temperature of the hot water mist 18a is reduced to form large hot water droplets. The droplets travel and collect on the internal peripheral surface of the pipe lining material 3, fall down, and pool as cooled hot water 18 at the bottom of the pipe lining material 3 and the pressure vessel 4. The hot water 18 is returned to the hot water tank 13 from the drain pipe 7 by the driving of the hot water pump 9 via the hot water hose 8, hot water pump 9, and pipe 10. The water is thus again heated to a prescribed temperature or higher and used to heat the pipe lining material 3.

The hot water mist 18a is continuously blown to heat the pipe lining material 3 during circulation and cure the thermosetting resin impregnated therein in order to line the main pipe 1. When curing is completed, the heating of the hot water tank 13 and the driving of the hot water pumps 9 and 15 are stopped, after which both ends of the pipe lining material 3 are severed, the pressure vessel 4 and hot water tube 16 are removed, and other actions are carried out to complete the lining work.

The biodegradable film 3b remains on the internal peripheral surface of the pipe lining material 3. However, when the sewage pipeline, including the main pipe 1, is put back into service after completion of the lining work, the biodegradable film 3b begins to be decomposed by microorganisms in the sewage. This allows the film to be eventually removed. Even if the film peels away and falls, it is removed with the sewage water without obstructing the flow of sewage. Therefore, there is no need to peel away the biodegradable film 3b after the thermosetting resin of the pipe lining material 3 has been cured, and there is also no need to remove and dispose of the film. The lining work can be accordingly simplified, the work time can be shortened, and the project costs can be reduced. Also, the internal peripheral surface of the lining material does not end up being damaged by work that is performed to peel away the film, which occurs in the case of conventional materials. Therefore, the roughness coefficient of the internal peripheral surface of the pipe lining material 3 can be reduced, and the flow rate of the sewage water inside the main pipe 1 can be increased.

Heating may be carried out by hot water showering, blowing a hot water spray, blowing steam, or using another method in lieu of spraying a hot water mist 18a as the method of heating the pipe lining material 3.

Figure 6:
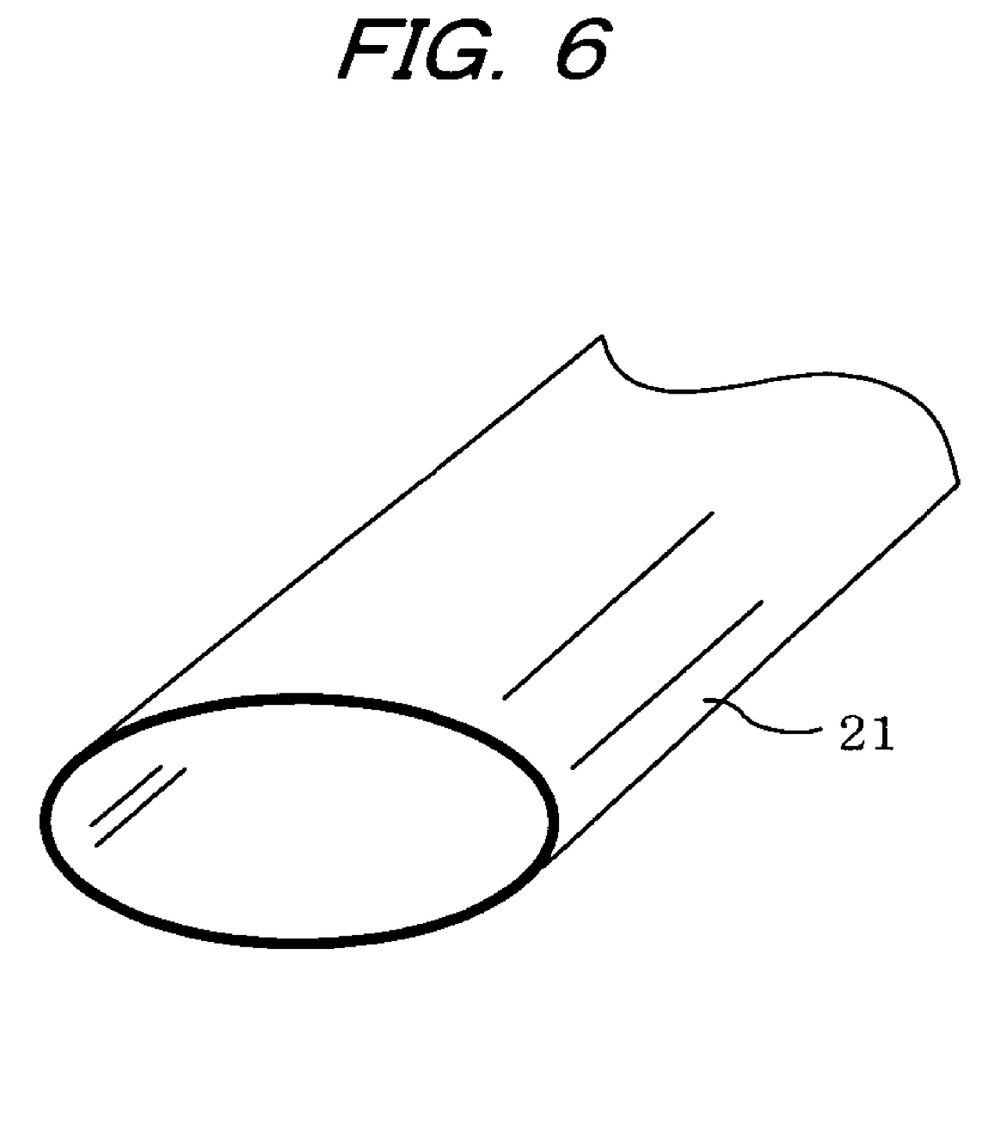
FIG. 6 is a perspective view showing a state prior to the use of the barrier liner.

In the above-mentioned embodiment, a pipe lining material 3 is directly inserted in the main pipe 1, but a barrier liner 21 may also be inserted in the main pipe 1 prior to the insertion of the pipe lining material 3, as shown in FIG. 4, as required to stop water from penetrating from the periphery of the main pipe 1, to prevent damage to the pipe lining material 3, or to obtain other effects. The barrier liner 21 is formed in a soft tubular shape (the shape of a bag), as shown in FIG. 6, and the diameter corresponds to the inside diameter of the main pipe 1. The barrier liner 21 is composed of the same biodegradable plastic film as the biodegradable film 3b of the pipe lining material 3.

Figure 4A:
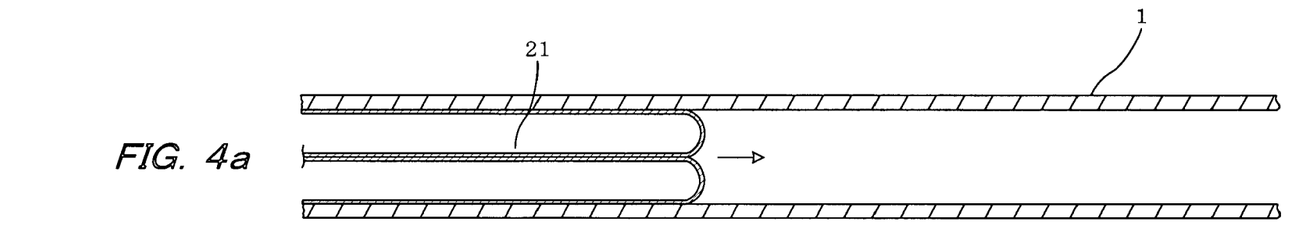
FIGS. 4a, 4b and 4c are cross-sectional views showing the order in which the lining of the main pipe is carried out using the pipe lining material and barrier liner of the present invention.
Figure 4B:
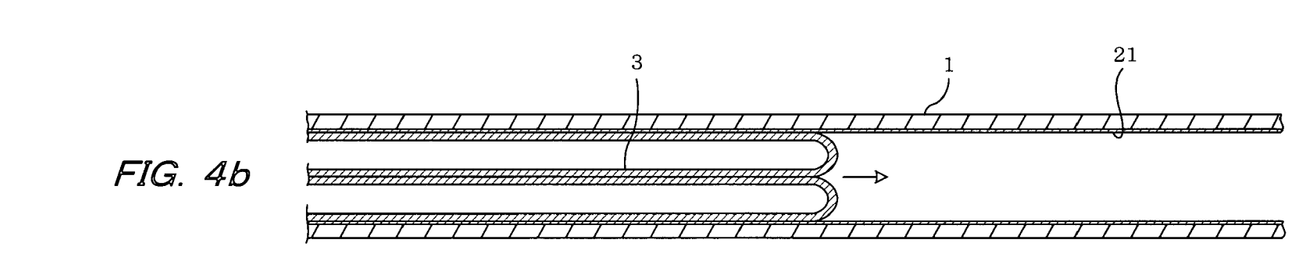
Figure 4C:
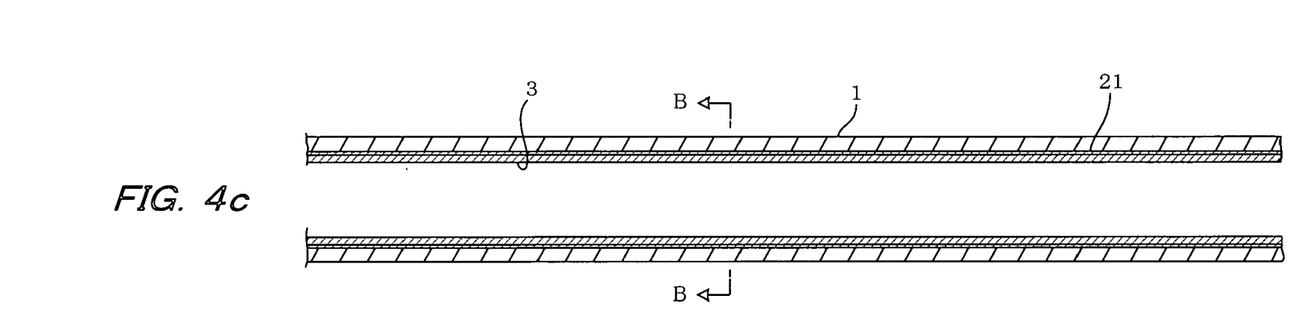
Figure 5:
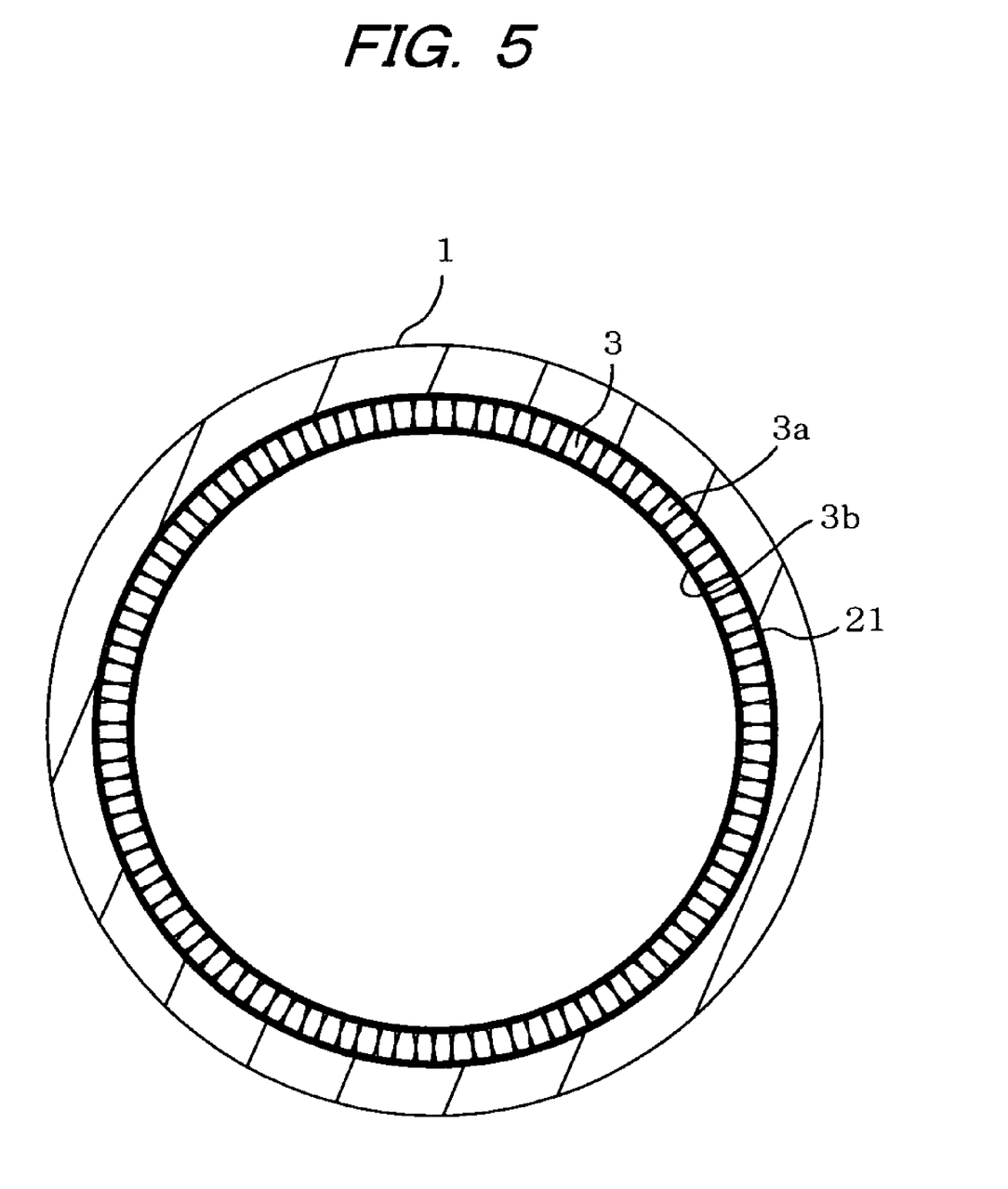
FIG. 5 is a cross-sectional view along the line B-B in FIG. 4c.

During lining, first, air pressure is allowed to operate on the barrier liner 21, and the barrier liner 21 is turned inside out and inserted into the main pipe 1, as shown in FIG. 4a. The liner may also be directly inserted without eversion. Next, the pipe lining material 3 is turned inside out and inserted into the main pipe 1 by air pressure or water pressure in the same manner as mentioned above (FIG. 4b). The pipe lining material 3 and barrier liner 21 are pressed against the internal peripheral surface of the main pipe 1, as shown in FIGS. 4c and 5, and in this state the pipe lining material 3 is heated by a hot water mist spraying, by hot water showering, or by another method in order to cure the thermosetting resin impregnated in the lining material.

Since the barrier liner 21 is also composed of a biodegradable film, the film begins to be naturally decomposed by microorganisms that are present on the internal peripheral surface of the main pipe 1 after the lining work is completed, and the film is eventually removed. For this reason, there is no need to ultimately dispose of the barrier liner 21 as required in the future, and no labor or disposal costs are incurred.

The biodegradable film may be attached on both the internal and external peripheral surfaces of the tubular resin absorption material 3a of the pipe lining material 3. In such a case, the barrier liner 21 is not required, and the biodegradable film on the external peripheral surface will naturally be removed in the same manner as the barrier liner, so there is no need to ultimately dispose of the film as may be required in the future, and no labor or disposal costs are incurred. In this case, the pipe lining material 3 may be directly drawn into the main pipe 1 without being turned inside out. It is also possible to apply the biodegradable film to only the external peripheral surface (after being turned inside out) of the tubular resin absorption material 3a of the pipe lining material 3.

Figure 7:
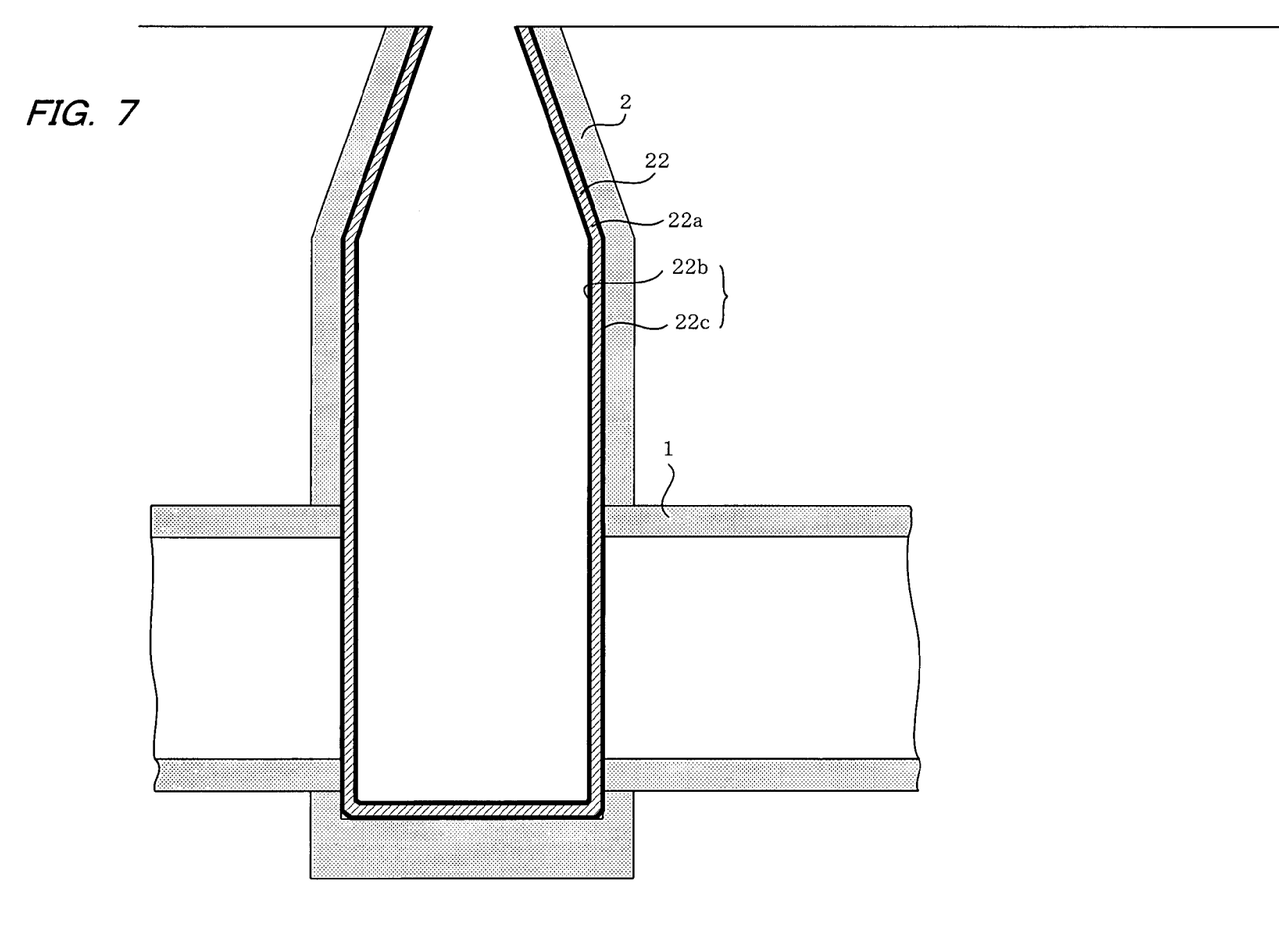
FIG. 7 is a cross-sectional view showing a state in which a manhole has been lined with the manhole lining material of the present invention.

FIG. 7 shows a state in which a manhole 2 has been lined with the manhole lining material 22. In the manhole lining material 22, biodegradable films 22b and 22c are applied on and made to cover both the internal and external peripheral surfaces of a bottomed soft tubular (cylindrical-shaped) resin absorption material 22a that corresponds to the manhole 2. The tubular resin absorption material 22a is obtained by sewing a nonwoven composed of resin fiber made of the same material as the tubular resin absorption material 3a, and is impregnated with the same uncured liquid thermosetting resin. The biodegradable films 22b and 22c are composed of a biodegradable plastic of the same material as the biodegradable film 3b and the biodegradable film of the barrier liner 21.

During lining, the manhole lining material 22 is inserted into the manhole 2 and then pressed against the internal peripheral surface and bottom surface of the manhole 2 by using air pressure or water pressure. The manhole lining material 22 is heated by blowing a hot water mist, by hot water showering, or by another method, and the thermosetting resin impregnated in the lining material is cured. The portion of the manhole lining material 22 obstructing the opening of the main pipe 1 that leads to the manhole 2 is thereafter cut away or otherwise removed to complete the lining work.

After the lining work is completed, the biodegradable films 22b and 22c of the manhole lining material 22 begin to be decomposed by microorganisms in the manhole 2, and the film is eventually removed. Therefore, the biodegradable film 22b does not need to be peeled away, the lining work of the manhole 2 can be simplified and completed in a shorter period of time, and project costs can be reduced. The internal peripheral surface of the manhole lining material is not damaged by the work of peeling away the film as is done in conventional methods, and the lining finish can be improved. Also, there is no need to ultimately dispose of the biodegradable film 22c as may be required in the future.

Depending on the lining work method, the biodegradable film may be applied to only the internal peripheral surface or the external peripheral surface of the tubular resin absorption material 22a of the manhole lining material 22.

The tubular resin absorption materials 3a and 22a of the lining materials 3 and 22 may be impregnated with an uncured liquid UV-curing resin in lieu of the uncured liquid thermosetting resin, and cured by UV irradiation.

What is claimed is:

1. A lining material for rehabilitating an existing pipe of a sewage pipeline, comprising: an eversible tubular resin absorption material having internal and external peripheral surfaces and being impregnated with a liquid curing resin, and a biodegradable plastic film applied to the external peripheral surface of the tubular resin absorption material so that when the lining material is everted and inserted into an existing pipe of a sewage pipeline, the biodegradable plastic film becomes the internal peripheral surface of the lining material and is decomposable by microorganisms in sewage that flows through the sewage pipeline.

2. A method for rehabilitating an existing pipe of a sewage pipeline, wherein the lining material as set forth in claim 1 is everted and inserted into the existing pipe, inflated against the existing pipe and cured to rehabilitate the existing pipe.

3. A lining material as set fourth in claim 1, wherein the biodegradable plastic film is made of only one film layer.

4. A lining material as set fourth in claim 1, wherein a biodegradable plastic film is applied to both the internal peripheral surface and the external peripheral surface of the tubular resin absorption material.

5. A lining material as set fourth in claim 4, wherein the biodegradable plastic film applied to each surface is made of only one film layer.

6. A lining material as set fourth in claim 4, wherein the biodegradable plastic film applied to the external peripheral surface of the tubular resin absorption material is a barrier liner.

7. A lining material for rehabilitating an existing manhole of a sewage pipeline, comprising: an inflatable tubular resin absorption material having internal and external peripheral surfaces and being impregnated with a liquid curing material, and a biodegradable plastic film applied to the internal peripheral surface of the tubular resin absorption material so that when the lining material is inserted into an existing manhole of a sewage pipeline and inflated, the biodegradable plastic film becomes the internal peripheral surface of the lining material and is decomposable by microorganisms in the manhole.

8. A method for rehabilitating an existing manhole of a sewage pipeline, wherein the lining material as set forth in claim 7 is inserted into the manhole, inflated against the manhole and cured to rehabilitate the manhole.

9. A lining material as set fourth in claim 7, wherein the biodegradable plastic film is made of only one film layer.

10. A lining material as set fourth in claim 7, wherein a biodegradable plastic film is applied to both the internal peripheral surface and the external peripheral surface of the tubular resin absorption material.

11. A lining material as set fourth in claim 10, wherein the biodegradable plastic film applied to each surface is made of only one film layer.

12. A lining material as set fourth in claim 10, wherein the biodegradable plastic film applied to the external peripheral surface of the tubular resin absorption material is a barrier liner.

13. A method for rehabilitating a pipe of a sewage pipeline, comprising the steps:

providing a lining material that has an eversible tubular resin absorption material having internal and external peripheral surfaces and that is impregnated with a liquid curing resin, and a biodegradable plastic film attached to the external peripheral surface of the tubular resin absorption material;

everting the lining material and inserting the everted lining material into a pipe to be rehabilitated so that the internal peripheral surface of the tubular resin absorption material faces outwardly towards an inner peripheral surface of the pipe and the biodegradable plastic film faces inwardly;

inflating the inserted lining material to press the everted internal surface thereof against the inner peripheral surface of the pipe; and curing the liquid curing resin impregnated in the inflated lining material so that the biodegradable plastic film becomes the inner peripheral surface of the rehabilitated pipe and is decomposed over time by microorganisms in sewage flowing through the sewage pipeline.

14. A method according to claim 13; wherein the biodegradable plastic film is composed of only a single film.

15. A method according to claim 14; wherein the biodegradable plastic film is attached to only the external peripheral surface of the tubular resin absorption material.

16. A method according to claim 14; wherein the biodegradable plastic film is attached to both of the internal and external peripheral surfaces of the tubular resin absorption material.

17. A method according to claim 13; wherein the biodegradable plastic film is attached to only the external peripheral surface of the tubular resin absorption material.

18. A method according to claim 13; wherein the biodegradable plastic film is attached to both of the internal and external peripheral surfaces of the tubular resin absorption material.

* * * * *